United States Patent
Saha et al.

(10) Patent No.: US 10,523,885 B2
(45) Date of Patent: Dec. 31, 2019

(54) COLUMN LINE CLAMP CIRCUIT FOR IMAGING ARRAY

(71) Applicant: Foveon, Inc., San Jose, CA (US)

(72) Inventors: Sudipta Saha, Milpitas, CA (US); Shivani Gupta, San Jose, CA (US)

(73) Assignee: Foveon, Inc., San Jose, CA (US)

( * ) Notice: Subject to any disclaimer, the term of this patent is extended or adjusted under 35 U.S.C. 154(b) by 126 days.

(21) Appl. No.: 15/492,951

(22) Filed: Apr. 20, 2017

(65) Prior Publication Data

US 2018/0176497 A1 Jun. 21, 2018

Related U.S. Application Data

(60) Provisional application No. 62/437,000, filed on Dec. 20, 2016.

(51) Int. Cl.
- *H04N 5/378* (2011.01)
- *H04N 5/16* (2006.01)
- *H04N 5/18* (2006.01)
- *H04N 5/359* (2011.01)

(52) U.S. Cl.
CPC ............. *H04N 5/378* (2013.01); *H04N 5/16* (2013.01); *H04N 5/18* (2013.01); *H04N 5/3598* (2013.01)

(58) Field of Classification Search
CPC .. H04N 5/3745; H04N 5/378; H04N 5/37455; H04N 5/37457; H04N 5/18; H04N 5/16
See application file for complete search history.

(56) References Cited

U.S. PATENT DOCUMENTS

| | | | | |
|---|---|---|---|---|
| 7,394,491 | B2 * | 7/2008 | Bae | H04N 5/3575 348/241 |
| 7,528,871 | B2 * | 5/2009 | Masuyama | H04N 3/155 348/294 |
| 7,635,833 | B2 | 12/2009 | Mansoorian | |
| 7,817,199 | B2 * | 10/2010 | Yamashita | H04N 5/3598 250/214 A |
| 8,085,319 | B2 * | 12/2011 | Ono | H04N 5/378 348/241 |
| 8,466,995 | B2 * | 6/2013 | Suzuki | H04N 5/3575 348/308 |
| 8,780,241 | B2 | 7/2014 | Johnson | |

(Continued)

FOREIGN PATENT DOCUMENTS

EP 2683157 A1 8/2014

OTHER PUBLICATIONS

EP17178043, European Search Report, dated Oct. 25, 2017.

*Primary Examiner* — Twyler L Haskins
*Assistant Examiner* — Akshay Trehan
(74) *Attorney, Agent, or Firm* — Glass and Associates; Kenneth Glass; Kenneth D'Alessandro

(57) ABSTRACT

In an imaging array having a plurality of pixel sensors arranged in a plurality of rows and columns, pixel data being read out on column lines of the array, a column line voltage clamp circuit for column lines of the array includes a master voltage clamp circuit coupled to provide a reference voltage clamp level on a reference node, and a slave voltage clamp circuit coupled to each column line in the imaging array, each slave voltage clamp circuit configured to clamp voltage on the column line to a column voltage clamp level derived from the reference voltage level.

14 Claims, 5 Drawing Sheets

(56) References Cited

U.S. PATENT DOCUMENTS

| | | | |
|---|---|---|---|
| 8,872,948 B2* | 10/2014 | Sugiura | H04N 5/378 |
| | | | 348/243 |
| 2001/0020676 A1 | 9/2001 | Nakaya | |
| 2006/0278809 A1* | 12/2006 | Takayanagi | H04N 5/3598 |
| | | | 250/208.1 |
| 2007/0242141 A1 | 10/2007 | Ciurea | |
| 2007/0248349 A1 | 10/2007 | Nanjo | |
| 2009/0033782 A1* | 2/2009 | Muroshima | H04N 5/3575 |
| | | | 348/308 |
| 2010/0188539 A1* | 7/2010 | Kobayashi | H04N 5/335 |
| | | | 348/300 |
| 2010/0328509 A1* | 12/2010 | Yamashita | H04N 5/3598 |
| | | | 348/300 |
| 2011/0063483 A1 | 3/2011 | Rossi | |
| 2011/0074986 A1* | 3/2011 | Ogata | H04N 5/361 |
| | | | 348/243 |
| 2011/0149129 A1 | 6/2011 | Kim | |
| 2011/0292264 A1* | 12/2011 | Kubo | H04N 5/3598 |
| | | | 348/301 |
| 2012/0188415 A1 | 7/2012 | Johnson | |
| 2013/0001404 A1 | 1/2013 | Meynants | |
| 2015/0249797 A1* | 9/2015 | Yui | H04N 5/3575 |
| | | | 250/208.1 |
| 2015/0256771 A1* | 9/2015 | Shimura | H04N 5/243 |
| | | | 348/272 |
| 2016/0006966 A1* | 1/2016 | Murakami | H04N 5/378 |
| | | | 348/308 |
| 2018/0158854 A1* | 6/2018 | Tubert | H01L 27/14612 |

* cited by examiner

COLUMN LINE CLAMP CIRCUIT FOR IMAGING ARRAY

BACKGROUND

The present invention relates to CMOS imaging arrays. More particularly, the present invention relates to column readout circuits for CMOS imaging arrays and to voltage clamp circuits for column line readout circuits.

In image sensor circuit, the node voltage on the floating diffusion node drops with increased exposure or brightness level. This voltage drop is reflected in the column voltage when the row select transistor is turned on. A clamp circuit is provided on the column line to define the lowest voltage to which the column is allowed to drop. Even though the voltage on the floating diffusion node may drop below the clamp voltage, the column is maintained at the minimum set clamp voltage thereby artificially limiting the brightness of the brightest object from which the photodiode 10 receives light energy.

The clamp circuit defines the lowest column voltage and is able to accurately limit the bright signal swing level to remain within the clipping range of the analog-to-digital converter. This prevents non-monotonic behavior in the transfer function of the sensor.

Conventional clamp circuits known to the inventors are based on open loop designs where voltage is applied from a digital-to-analog convertor (DAC) to the gate of a clamp transistor. FIG. 1 is a schematic diagram that depicts a typical pixel sensor (photodiode 10) coupled to a column line 12 for reading out the sensed light. A transfer switch 14, usually in the form of an n-channel transistor isolates the photodiode 10 from a floating node 16. The floating node 16 and the cathode of the photodiode 10 are reset to a voltage $V_{DD}$ on line 18 by turning on a reset transistor 20 for a reset period of time while the transfer switch 14 is turned on. After the reset time has ended, reset transistor 20 is turned off and photocharge generated by the photodiode 10 accumulates as a voltage on the capacitance of the floating node 16. At the end of an exposure period, the transfer switch 14 is turned off and the accumulated photocharge voltage is stored on the floating node 16. When it is desired to read the photocharge voltage charge out of the pixel sensor through source follower transistor 22, row select transistor 24 is turned on and the voltage representing the accumulated charge is placed on column line 12. Typically the row select transistors of all of the pixel sensors in a single row in the array of pixel sensors are all turned on at once to read out the image from an array of pixel sensors one row at a time.

A clamp circuit 26 is associated with the column line 12. The clamp circuit is provided on the column line 12 to define the lowest voltage to which the column is allowed to drop in order to prevent overexposure nonlinearities that would otherwise arise from over-ranging the analog-to-digital converter coupled to the column line. Even though the voltage on the floating diffusion node 16 may drop below the clamp voltage set by clamp circuit 26, the column line 12 is maintained at the minimum set clamp voltage to artificially control the maximum brightness of bright objects.

The column line is driven by a current source 28. The clamp circuit 26 includes a clamp transistor 30 connected across the source follower transistor 22 and the row-select transistor 24. The gate of clamp transistor 30 is driven by a voltage that is set by a voltage controller 32 in clamp circuit 26. The voltage controller 32 may contain a digital-to-analog converter 34 driven by an n-bit digital word on inputs 36. The n-bit word is set by the circuit designers to cause the clamp transistor to set a minimum voltage to which the column line 12 may drop. The clamp circuit is turned on by a global pixel readout signal (GPR) shown at reference numeral 40, activated only during image readout operations.

FIG. 2 is a voltage diagram that illustrates determination of a typical clamping level for a sample photodiode pixel sensor design. The pixel design in FIG. 2 may have a dark level of 1.9V±300 mV. The clamp transistor operates across a user variable voltage range (as set by the voltage controller 32 of FIG. 1) of between about 100 mV and 500 mV. This gives an operational signal swing of about 1.7V. At about 100 mV the clamp transistor is fully turned on and is the lowest clamp voltage to provide the necessary headroom that will maintain the bias current transistor turned on. At about 200 mV the clamp transistor turns off. This is the brightness saturation level that is set for the design. Persons of ordinary skill in the art will recognize that this example is illustrative only in order to help provide an understanding of the present invention. Such skilled persons will recognize that particular pixel sensor designs may exhibit characteristics that vary from those shown in FIG. 2 and can easily adjust column line clamping settings for particular pixel sensor and array designs from the teachings of the present invention.

The threshold voltage of the clamp transistor 30 varies with process, voltage and temperature. These variations result in precision errors in the column clamp voltage set by the clamp circuit 26. In conventional clamp circuits the column clamp voltage can vary by 250 mV or more. Such high clamp voltage variations can present a significant problem in image sensors since the bright level signal swing cannot be guaranteed to remain linear or have monotonic behavior that remains within the clipping range of the analog-to-digital converter used to convert the column output signal.

In addition, conventional column clamp circuits tend to be relatively slow and incur signal loss since they are based on open loop systems. This also presents a problem in image sensors when it is desired to operate them at frame rates suitable for video applications.

BRIEF DESCRIPTION

The clamp circuit of the present invention is based on Replicate biasing circuit which is a method to ensure that the bias current in the active circuit matches very closely with the bias current in the replicate circuit over process, voltage and temperature variations. This ensures that Vcolumn=VRColClampFB, where VRColClampFB is set to the desired clamp voltage. This is programmable and is set by Vref from resistor ladder setting.

In accordance with the present invention, the floating diffusion node value drops with increased exposure or brightness of the object reflected by the column voltage. Once the floating diffusion node drops below the set clamp voltage level the column voltage is clamped to the desired level and will not drop any further.

According to one aspect of the present invention, the clamp circuit is based on Replicate biasing circuit which is a method to ensure that the bias current in the active circuit matches very closely with the bias current in the replicate circuit over process, voltage and temperature variations. This will ensure that Vcolumn=VRColClampFB, where VRColClampFB is set to the desired clamp voltage. The close loop regulator operational amplifier has a feedback path via VRColClampFB which ensures that clamped voltage at column matches very closely to the desired set value Vref. This configuration provides higher precision and speed compared to conventional column voltage clamp implementations. The precision is due to the low gain error set by the high open loop gain of the operational amplifier and high speed is determined by high unity gain bandwidth of the amplifier.

BRIEF DESCRIPTION OF THE DRAWING FIGURES

The invention will be explained in more detail in the following with reference to embodiments and to the drawing in which are shown:

DETAILED DESCRIPTION

Persons of ordinary skill in the art will realize that the following description of the present invention is illustrative only and not in any way limiting. Other embodiments of the invention will readily suggest themselves to such skilled persons.

Figure 3:
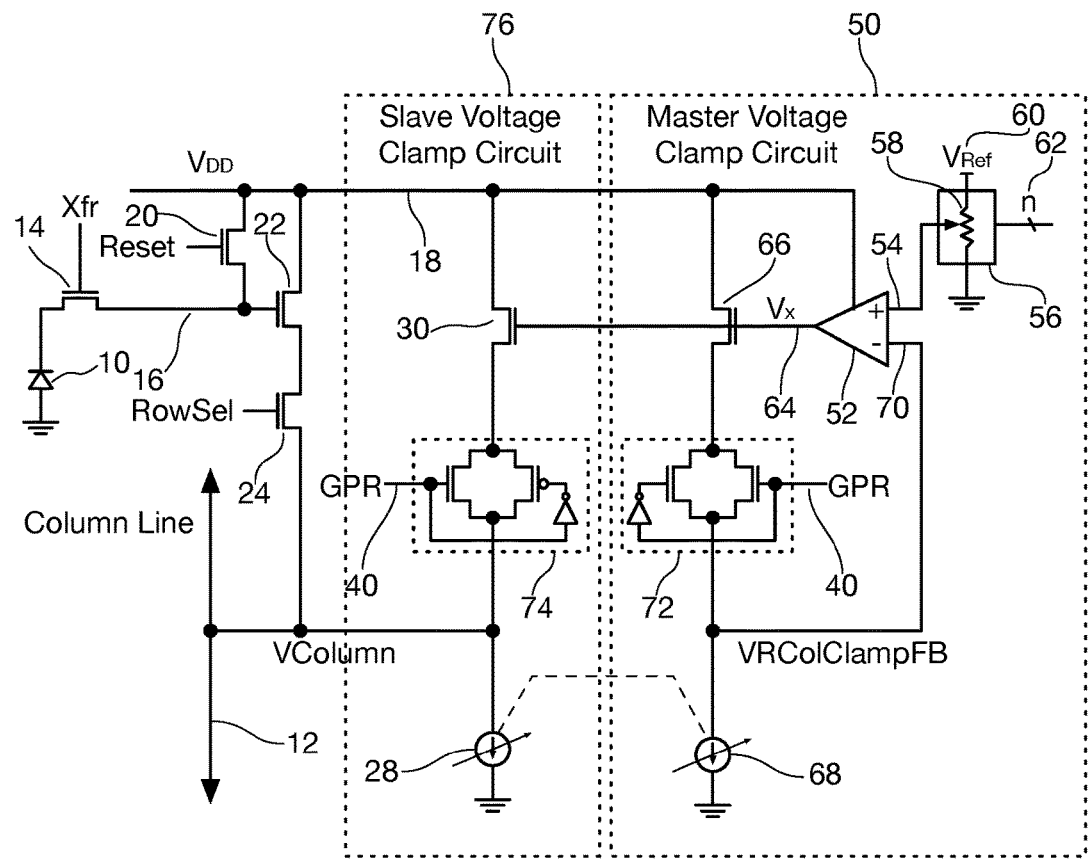
FIG. 3 is a schematic diagram that depicts a typical pixel sensor coupled to a column line and controlled by a clamp in accordance with one aspect of the present invention for reading out the sensed light.

Referring now to FIG. 3, a column line master voltage clamp circuit 50 in accordance with the present invention is shown. FIG. 3 is a schematic diagram that depicts a typical pixel sensor (photodiode 10) coupled to a column line 12 for reading out the sensed light. A transfer switch 14, usually in the form of an n-channel transistor isolates the photodiode 10 from a floating node 16. The floating node 16 and the cathode of the photodiode 10 are reset to a voltage $V_{DD}$ on line 18 by turning on a reset transistor 20 for a reset period of time while the transfer switch 14 is turned on. After the reset time has ended, reset transistor 20 is turned off and photocharge generated by the photodiode 10 accumulates as a voltage on the capacitance of the floating node 16. At the end of an exposure period, the transfer switch 14 is turned off and the accumulated photocharge voltage is stored on the floating node 16. When it is desired to read the photocharge voltage out of the pixel sensor through source follower transistor 22, row select transistor 24 is turned on and the voltage representing the accumulated charge is placed on column line 12. Typically the row select transistors of all of the pixel sensors in a single row in the array of pixel sensors are all turned on at once to read out the image from an array of pixel sensors one row at a time.

According to one aspect of the present invention, a master voltage clamp circuit 50 is associated with the column line 12. The master voltage clamp circuit 50 includes operational amplifier 52 having its non-inverting input 54 driven by a voltage controller 56. In one illustrative embodiment of the invention, voltage controller 56 is a digitally controlled resistor ladder 58 driven from a reference voltage 60 and that receives an n-bit digital word on lines 62 to control its resistance. The output 64 of operational amplifier 52 at the voltage Vx forms the output line of master voltage clamp circuit 50 and drives the gate of a source-follower transistor 66 having current source 68 as its load. Current source 68 is matched to current source 28 coupled to the column line. As will be appreciated by persons of ordinary skill in the art, current sources 28 and 68 can be formed as branches of a current mirror, with one branch supplying each of the column lines in the array.

Transistor 66 is a native transistor to avoid causing a significant voltage drop across it due to the bulk effect of the transistor 66. The inverting input 70 of the operational amplifier 52 is fed from the output of the source-follower transistor 66, thus forming a feedback loop. High open loop gain of operational amplifier 52 ensures that the voltages at inverting and non-inverting inputs settle to the same value, which in turn sets the output voltage Vx of the operational amplifier 52.

Figure 2:
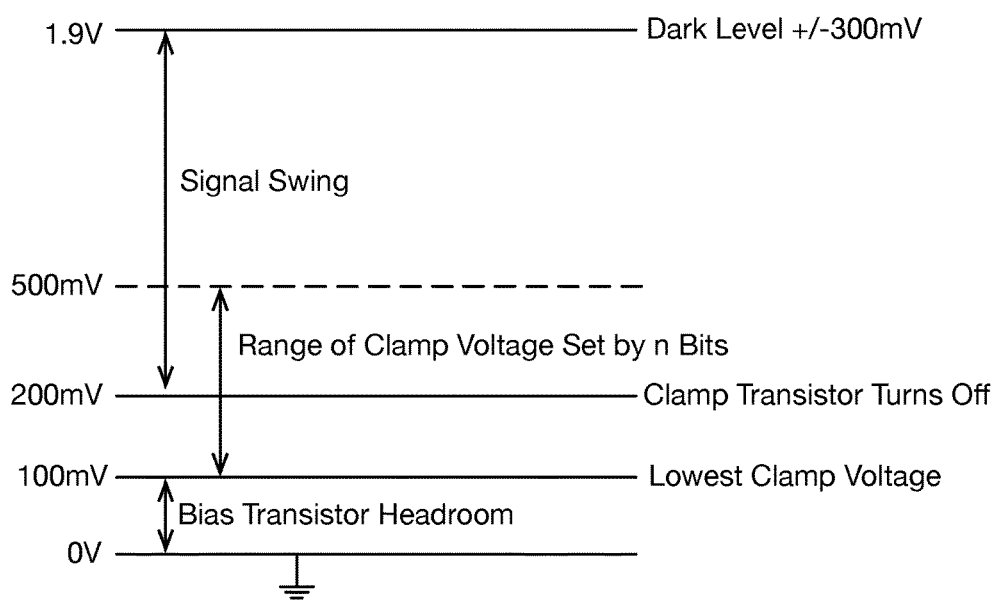
FIG. 2 is a diagram showing how a typical clamping level is determined.

The voltage Vx at the output line 64 of the master voltage clamp circuit 50 drives the clamp transistor 30 in the slave voltage clamp circuit associated with the column line 12 for each column. The voltage Vx drives the clamp transistor 30 on the column line 12 to define the lowest voltage to which the column is allowed to drop in order to prevent overexposure nonlinearities that would otherwise arise from overranging the analog-to-digital converter coupled to the column line as shown in FIG. 2. Even though the voltage on the floating diffusion node 16 may drop below the clamp voltage set by clamp circuit 50, the column line 12 is maintained at the minimum set clamp voltage to artificially control the maximum brightness of bright objects.

Figure 1:
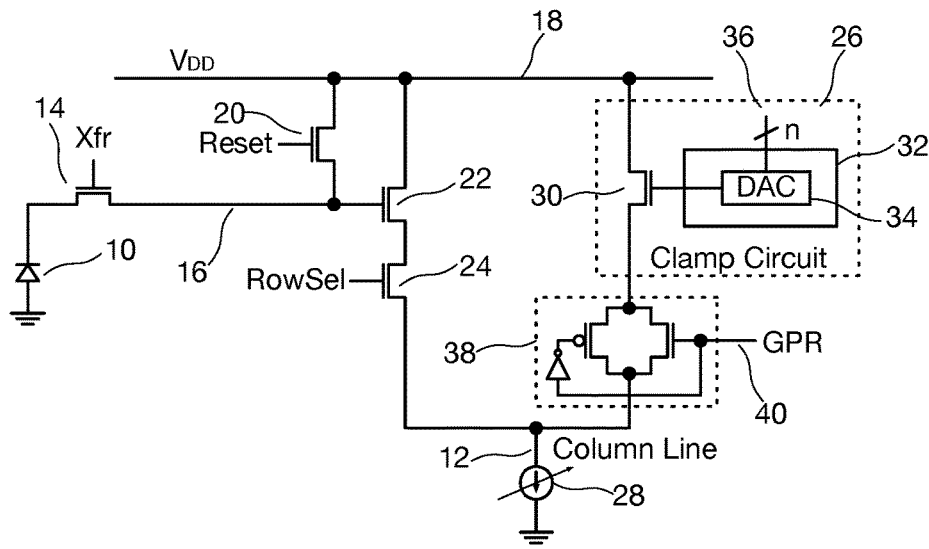
FIG. 1 is a schematic diagram that depicts a typical prior-art pixel sensor coupled to a column line and controlled by a clamp circuit for reading out the sensed light.
Figure 4:
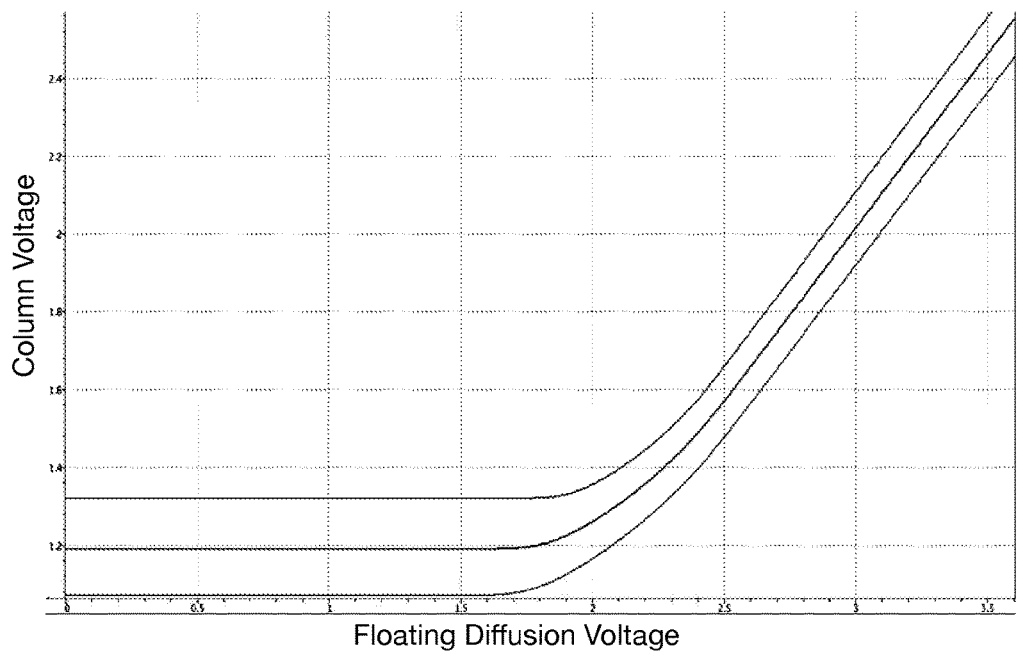
FIG. 4 is a graph showing the performance variation of a typical prior-art column clamping circuit such as the one depicted in FIG. 1.
Figure 5:
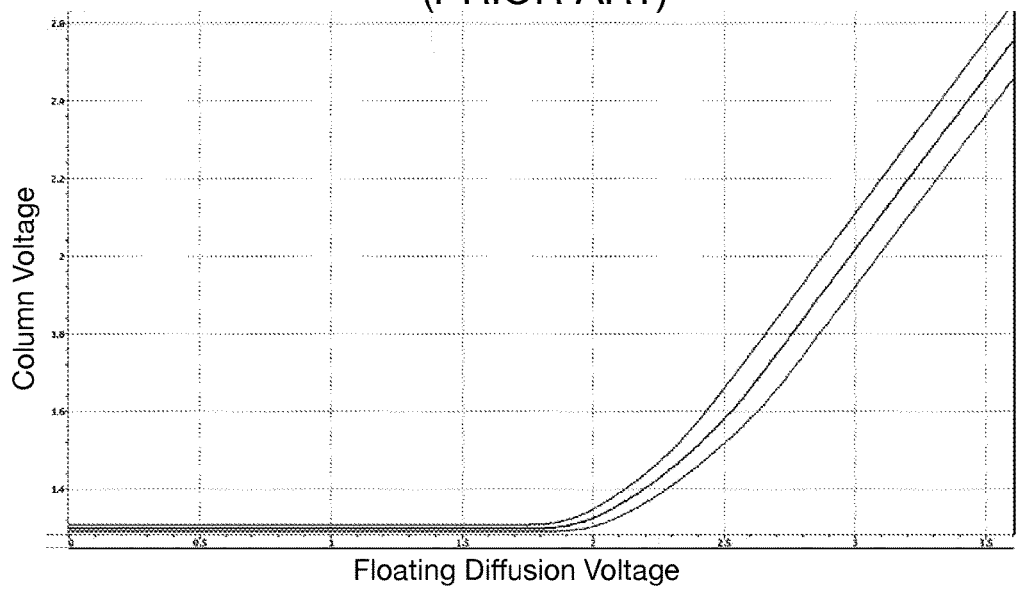
FIG. 5 is a graph showing the performance variation of a column clamping circuit such as in accordance with the present invention such as the one depicted in FIG. 3.

Referring now to FIGS. 4 and 5, graphs illustrate differences between prior art column clamping circuits such as the one depicted in FIG. 1 and column clamping circuits implemented in accordance with the present invention. In each case, the curves result from application of 1.52V applied to the gate of the clamping device. Persons of ordinary skill in the art will appreciate that from FIG. 4 it may be seen that the variation between fast and slow clamping action can extend over 250 mV, while, as shown in FIG. 5, it may be seen that the variation between fast and slow clamping action extends by only about 20 mV.

The current paths through the source follower transistors 66 and 30, respectively, in the master voltage clamp circuit 50 and the slave voltage clamp circuit associated with column line 12 are both switched. The current path through source follower transistor 66 in the clamp circuit 50 is switched by CMOS pass gate 72. The current path through source follower transistor 30 in the column line 12 is switched by CMOS pass gate 74. The gates of CMOS pass gates 72 and 74 are both controlled by the global pixel readout signal (GPR) shown at reference numeral 40, activated only during image readout operations. As will be readily understood by persons of ordinary skill in the art, the slave voltage clamp circuit in each column of the array indicated within dashed lines 76 includes the clamp transistor 20, the pass gate 74, and the current source 28. The clamp transistor 30 of each slave voltage clamp circuit has its gate connected to the gate of transistor 66 in the master voltage clamp circuit 50 and the current source 28 of each slave voltage claim circuit is matched to current source 68 in the master voltage clamp circuit 50.

There are several advantages provided by the present invention. The present invention permits precise setting of the column clamp voltage. In addition, there is much less voltage variation over process, voltage and temperature (PVT) compared to conventional column clamp voltage architectures. There is also less signal loss with respect to the column voltage setting compared to conventional architecture.

The present invention also provides a speed advantage over prior column clamp voltage circuits. The conventional clamp circuit of FIG. 1 is based on open loop design where the voltage applied to the gate of the slave voltage clamp transistor 30 is supplied by a digital-to-analog convertor. The threshold voltage of the slave voltage clamp transistor 30 varies with process, voltage and temperature which is reflected as precision error in the column clamp voltage. In the conventional clamp circuit of FIG. 1, the voltage can vary by as much as 250 mV. Such a large voltage variation presents a significant problem in image sensors since it cannot guarantee that the bright level signal swing will remain linear or have monotonic behavior within the clipping range of the analog-to-digital converter. In addition, the conventional column clamp circuit is slower and incurs signal loss since it employs an open-loop error correction circuit. This presents a problem in image sensors that need increased frame rates for video applications.

The present invention provides a sharp transition that helps to speed up image sensor operation compared to conventional architectures. In addition, the column voltage clamp circuit of the present invention prevents non-monotonicity in transfer function of the image sensor.

Figure 6:
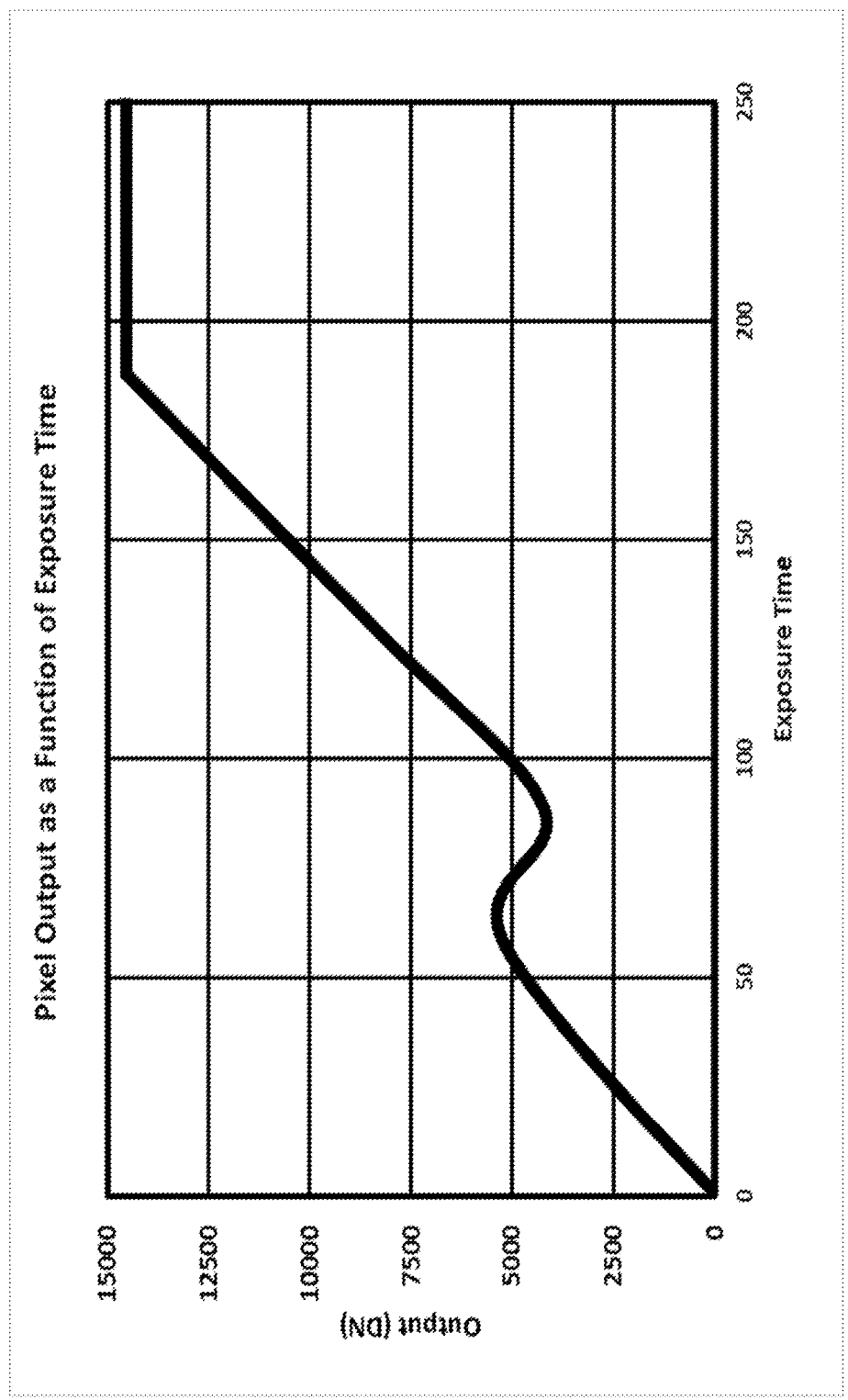
FIG. 6 is a graph of column output voltage as a function of exposure time illustrating the behavior of a typical prior-art column clamping circuit.
Figure 7:
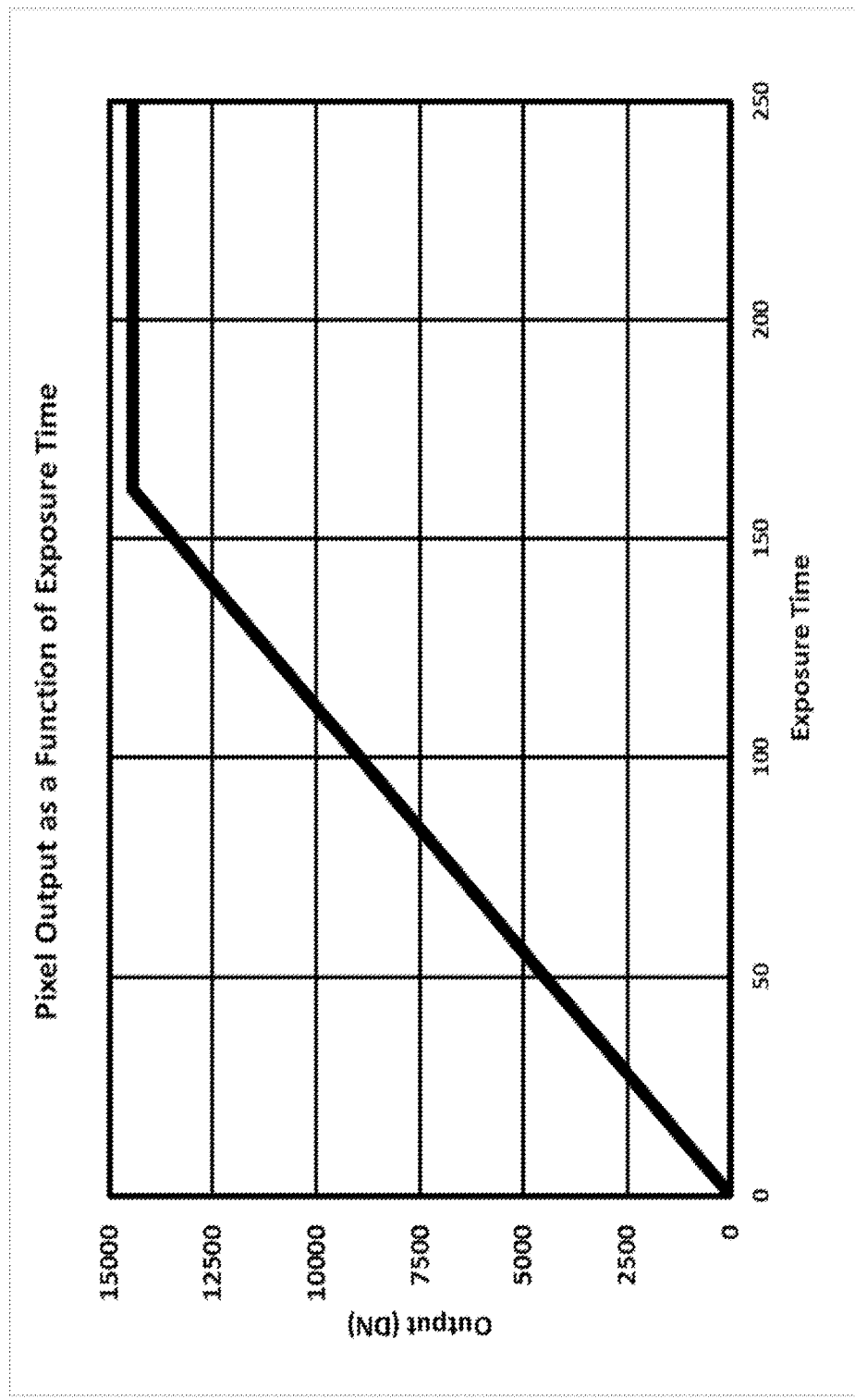
FIG. 7 is a graph of column output voltage as a function of exposure time illustrating the behavior of a column clamping circuit in accordance with the present invention.

Referring now to FIG. 6 and FIG. 7, two graphs of column output voltage as a function of time illustrate that the present invention prevents non-monotonicity in transfer function of the image sensor. In both FIG. 6 and FIG. 7, the X-axis is time, measured in rows (the time it takes to read image data from a single row), and the Y-axis is digitized voltage.

Several types of pixels like optical black pixels (OB), highlight pixels (HLP) and focal plane phase detector pixels (FPPD) are used in image sensor chips. For all above pixel operations, if a sequence of very bright signal (column voltage drops to almost 0V) followed by a low-light or dark signal occurs, the reset voltage ($V_{rst}$) for the next column gets corrupted. Because of this, the value of $V_{rst}$ is less than $V_{sig}$ for such highly saturated pixels. The difference between $V_{rst}$ and $V_{sig}$ modified by internal gain is outputted to analog-digital converters (ADC). The aforementioned problem causes the input to the ADC to go out of conversion range which eventually results in non-monotonic behavior in the transfer function of the sensor as illustrated in FIG. 6. The signal clamp voltage is programmable and the dynamic range of the circuit is adjustable. This programmability and adjustability of the clamp circuit in the present invention provides the ability to accurately limit the bright signal swing so that it remains linear within the clipping range of the analog-to-digital converter and prevents the column voltage from dropping all the way to 0V. This will help achieve linearity by design for OB, HLP and FPPD pixel operation and will prevent non-monotonicity in sensor's transfer function. Use of the clamp circuit of the present invention provides increased readout speed. Use of the clamp circuit of the present invention also reduces crosstalk interference caused by a completely saturated signal read out from a previous color. When a column signal is highly saturated, the clamp circuit of the present invention prevents the column from dropping all the way to 0V so the interference effect is reduced considerably less crosstalk from previous color to next color is achieved.

The column clamp circuit of the present invention is based on a replicate biasing circuit which ensures that the bias current in each column in the active circuit matches very closely with the bias current in the replicate circuit over process, voltage and temperature variations. This will ensure that the voltage on each column is matched to the desired clamp voltage set in the clamp circuit 50. The closed loop regulator operational amplifier 52 includes a feedback path which ensures that clamped voltage at the column matches very closely to the desired set value obtained from resistive ladder 56 using $V_{ref}$ 60. This provides much higher precision and speed compared to conventional clamp implementation such as that shown in FIG. 1. The precision is due in part to a very low gain error set by the high open loop gain of the amplifier 52 and the high speed is determined by the high unity gain bandwidth of the amplifier 52.

The column voltage clamp circuit of the present invention also keeps column current flowing. The column bias current devices require minimum voltage headroom to act as current bias circuits. By ensuring that each column is clamped and no reduction in column voltage is allowed, the headroom is assured for such devices. In previous designs the column voltage drops to zero for heavy saturation. The current also drops, resulting in a significant current spike that may cause color stripe in some modes. This current drop is less likely to occur when the column voltage clamp circuit of the present invention is used when the column clamps are ON since minimum voltage headroom for column bias current devices is assured.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In an imaging array having a plurality of pixel sensors arranged in a plurality of rows and columns, pixel data being read out on column lines of the array, a column line voltage clamp circuit for column lines of the array comprising:
    a master voltage clamp circuit coupled to provide a fixed reference maximum brightness voltage clamp level on a reference node;
    a slave maximum brightness voltage clamp circuit coupled to each column line in the imaging array, each slave voltage clamp circuit configured to clamp voltage on the column line to a fixed column voltage clamp level derived from the fixed reference voltage level; and
    wherein the reference voltage maximum brightness clamp level is established by a reference source-follower transistor driving a reference current source load, a gate of the reference source-follower transistor driven by an operational amplifier having a non-inverting input coupled to a reference voltage potential, and an inverting input coupled to the reference node, and the slave voltage clamp circuit coupled to each column line comprises a column source-follower transistor driving a column current source load connected to the column line, the column current source load sourcing a current derived from the reference current source load.

2. The column line voltage clamp circuit of claim 1 wherein the reference source-follower transistor and the column source-follower transistor are both native transistors.

3. The column line voltage clamp circuit of claim 2 wherein the reference source-follower transistor and the column source-follower transistor are the same size.

4. The column line voltage clamp circuit of claim 1 wherein the reference current source load and the column current source load for each slave voltage clamp circuit are branches of a current mirror.

5. The column line voltage clamp circuit of claim 1 wherein the reference voltage potential is settable.

6. The column line voltage clamp circuit of claim 1, further comprising a switch connected between the reference source-follower transistor and the reference current source.

7. The column line voltage clamp circuit of claim 1, further comprising a switch connected between the column source-follower transistor and the column current source of each slave voltage clamp circuit.

8. In an imaging array having a plurality of pixel sensors arranged in a plurality of rows and columns, pixel data being read out on column lines of the array, a column line voltage clamp circuit for column lines of the array comprising:
 a master voltage maximum brightness clamp circuit coupled to provide a fixed reference voltage clamp level on a reference node;
 a slave voltage maximum brightness clamp circuit coupled to each column line in the imaging array, each slave maximum brightness voltage clamp circuit configured to clamp voltage on the column line to a fixed column maximum brightness voltage clamp level derived from the fixed reference voltage level during pixel data readout to define the lowest voltage to which columns are allowed to drop; and
 wherein the reference maximum brightness voltage clamp level is established by a reference source-follower transistor driving a reference current source load, a gate of the reference source-follower transistor driven by an operational amplifier having a non-inverting input coupled to a reference voltage potential, and an inverting input coupled to the reference node, and the slave maximum brightness voltage clamp circuit coupled to each column line comprises a column source-follower transistor driving a column current source load connected to the column line, the column current source load sourcing a current derived from the reference current source load.

9. The column line voltage clamp circuit of claim 8 wherein the reference source-follower transistor and the column source-follower transistor are both native transistors.

10. The column line voltage clamp circuit of claim 8 wherein the reference source-follower transistor and the column source-follower transistor are the same size.

11. The column line voltage clamp circuit of claim 8 wherein a load for the reference current source and a load for each slave voltage clamp circuit are branches of a current mirror.

12. The column line voltage clamp circuit of claim 8 wherein the reference voltage potential is settable.

13. The column line voltage clamp circuit of claim 8, further comprising a switch connected between the reference source-follower transistor and the reference current source.

14. The column line voltage clamp circuit of claim 8, further comprising a switch connected between the column source-follower transistor and the column current source of each slave voltage clamp circuit.

* * * * *